(12) United States Patent
Benadjaoud et al.

(10) Patent No.: US 8,832,143 B2
(45) Date of Patent: Sep. 9, 2014

(54) CLIENT-SIDE STATEMENT CACHE

(75) Inventors: Ghazi Nourdine Benadjaoud, Pleasanton, CA (US); Peter Schneider, Dublin, CA (US)

(73) Assignee: Sybase, Inc., Dublin, CA (US)

(*) Notice: Subject to any disclaimer, the term of this patent is extended or adjusted under 35 U.S.C. 154(b) by 0 days.

(21) Appl. No.: 12/970,243

(22) Filed: Dec. 16, 2010

(65) Prior Publication Data

US 2012/0158770 A1 Jun. 21, 2012

(51) Int. Cl.
*G06F 17/30* (2006.01)

(52) U.S. Cl.
CPC ............................. *G06F 17/30457* (2013.01)
USPC ............................................. 707/769; 717/137

(58) Field of Classification Search
USPC ................ 707/1, 10, 802, 780, 718, 768, 769
See application file for complete search history.

(56) References Cited

U.S. PATENT DOCUMENTS

| | | | | |
|---|---|---|---|---|
| 5,627,979 A * | 5/1997 | Chang et al. | ................... | 715/763 |
| 6,115,703 A * | 9/2000 | Bireley et al. | ................. | 707/704 |
| 6,289,344 B1 * | 9/2001 | Braia et al. | ............................ | 1/1 |
| 6,321,235 B1 * | 11/2001 | Bird | ............................ | 707/802 |
| 6,598,058 B2 * | 7/2003 | Bird et al. | ............................ | 1/1 |
| 7,099,863 B2 * | 8/2006 | Bird et al. | ..................... | 707/780 |
| 7,174,327 B2 * | 2/2007 | Chau et al. | ............................ | 1/1 |
| 7,334,223 B2 * | 2/2008 | Kumar et al. | .................. | 717/137 |
| 7,516,138 B2 * | 4/2009 | Bernal et al. | ............................ | 1/1 |
| 7,664,798 B2 * | 2/2010 | Wood et al. | .................. | 707/649 |
| 7,877,378 B2 * | 1/2011 | Gray | ............................. | 707/718 |
| 7,912,851 B2 * | 3/2011 | Barsness et al. | ............. | 707/768 |
| 8,065,275 B2 * | 11/2011 | Eriksen et al. | ................ | 707/661 |
| 2002/0107835 A1 * | 8/2002 | Coram et al. | ..................... | 707/1 |
| 2002/0156786 A1 * | 10/2002 | Martin et al. | .................. | 707/10 |
| 2003/0101353 A1 * | 5/2003 | Tarquini et al. | .............. | 713/200 |
| 2005/0021514 A1 * | 1/2005 | Barga et al. | ....................... | 707/3 |
| 2007/0143344 A1 * | 6/2007 | Luniewski et al. | ......... | 707/104.1 |
| 2008/0098041 A1 * | 4/2008 | Chidambaran et al. | ........ | 707/201 |
| 2008/0140622 A1 * | 6/2008 | Bestgen et al. | .................... | 707/3 |
| 2010/0185704 A1 * | 7/2010 | George et al. | ................. | 707/821 |
| 2011/0276579 A1 * | 11/2011 | Colrain et al. | ................ | 707/756 |

* cited by examiner

*Primary Examiner* — James Trujillo
*Assistant Examiner* — Thong Vu
(74) *Attorney, Agent, or Firm* — Sterne, Kessler, Goldstein & Fox P.L.L.C.

(57) ABSTRACT

Embodiments include a method, apparatus and computer program product for providing instructions from a database client to a database server. The method includes the steps of receiving from a database a representation of a first instruction and an associated identifier. The representation of the first instruction and the associated identifier are stored in a cache. A second instruction, from an application, is matched with the representation of the first instruction stored in the cache. The associated identifier is retrieved from the cache based on the matching and the associated identifier is sent to the database server. Upon receipt of the associated identifier, the database server executes the first instruction.

20 Claims, 8 Drawing Sheets

CLIENT-SIDE STATEMENT CACHE

FIELD OF THE INVENTION

The present invention generally relates to improving database performance.

BACKGROUND OF THE INVENTION

Computer applications increasingly rely on database systems. Modern database systems have implemented different techniques to improve system performance. Database performance can be improved by enabling client application developers to encode special database instructions designed to streamline different functions. Though different performance enhancing techniques are available, currently many database client developers do not know they exist or are unfamiliar with their use.

Dynamic Structured Query Language (DSQL) is a special type of performance enhancing database instruction that has been implemented by database vendors but is often not used by many database developers. Instead of using DSQL, developers continue to use traditional embedded SQL to implement database applications.

BRIEF SUMMARY

Embodiments of the present invention relate to database instructions. Specifically, embodiments provide a method, apparatus and computer program product for providing instructions from a database client to a database server. The method includes the steps of receiving from a database a representation of a first instruction and an associated identifier. The representation of the first instruction and the associated identifier are stored in a cache. A second instruction, from an application, is matched with the representation of the first instruction stored in the cache. The associated identifier is retrieved from the cache based on the matching and the associated identifier is sent to the database server. Upon receipt of the associated identifier, the database server executes the first instruction.

Another embodiment includes an apparatus for executing an instruction on a database. The system apparatus includes a cache coupled to a database, the cache being configured to receive from the database a representation of a first instruction and an associated identifier. The cache is further configured to store the representation of a first instruction and the associated identifier in the cache. An application interface is coupled to an application, and configured to receive a second instruction from the application. A matcher is configured to match the representation of the first instruction to the received second instruction, and an identifier retriever is configured to retrieve an identifier based on a result from the matcher. Finally, a database interface is configured to send the identifier to the database, wherein upon receipt of the identifier, the database is configured to execute the first instruction.

Further features and advantages, as well as the structure and operation of various embodiments are described in detail below with reference to the accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

The features and advantages of the present invention will become more apparent from the detailed description set forth below when taken in conjunction with the drawings.

DETAILED DESCRIPTION OF EMBODIMENTS

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

Features and advantages of the invention are set forth in the description that follows, and in part are apparent from the description, or may be learned by practice of the invention. The advantages of the invention are realized and attained by the structure and particularly pointed out in the written description and claims hereof as well as the appended drawings. The following detailed description is exemplary and explanatory and is intended to provide further explanation of the invention as claimed.

The embodiment(s) described and references in the specification to "one embodiment," "an embodiment," "an example embodiment," etc., indicate that the embodiment(s) described may include a particular feature, structure, or characteristic. However, every embodiment may not necessarily include the particular feature, structure or characteristic. Moreover, such phrases are not necessarily referring to the same embodiment. When a particular feature, structure or characteristic is described in connection with an embodiment, it is understood that it is within the knowledge of one skilled in the art to effect such feature, structure, or characteristic in connection with other embodiments, whether or not explicitly described.

It would be apparent to one of skill in the relevant art that the embodiments described below can be implemented in many different embodiments of software, hardware, firmware, and/or the entities illustrated in the figures. Any actual software code with the specialized control of hardware to implement embodiments is not limiting of this description. Thus, the operational behavior of embodiments is described with the understanding that modifications and variations of the embodiments are possible, given the level of detail presented herein.

Conventional Approaches

Figure 1:
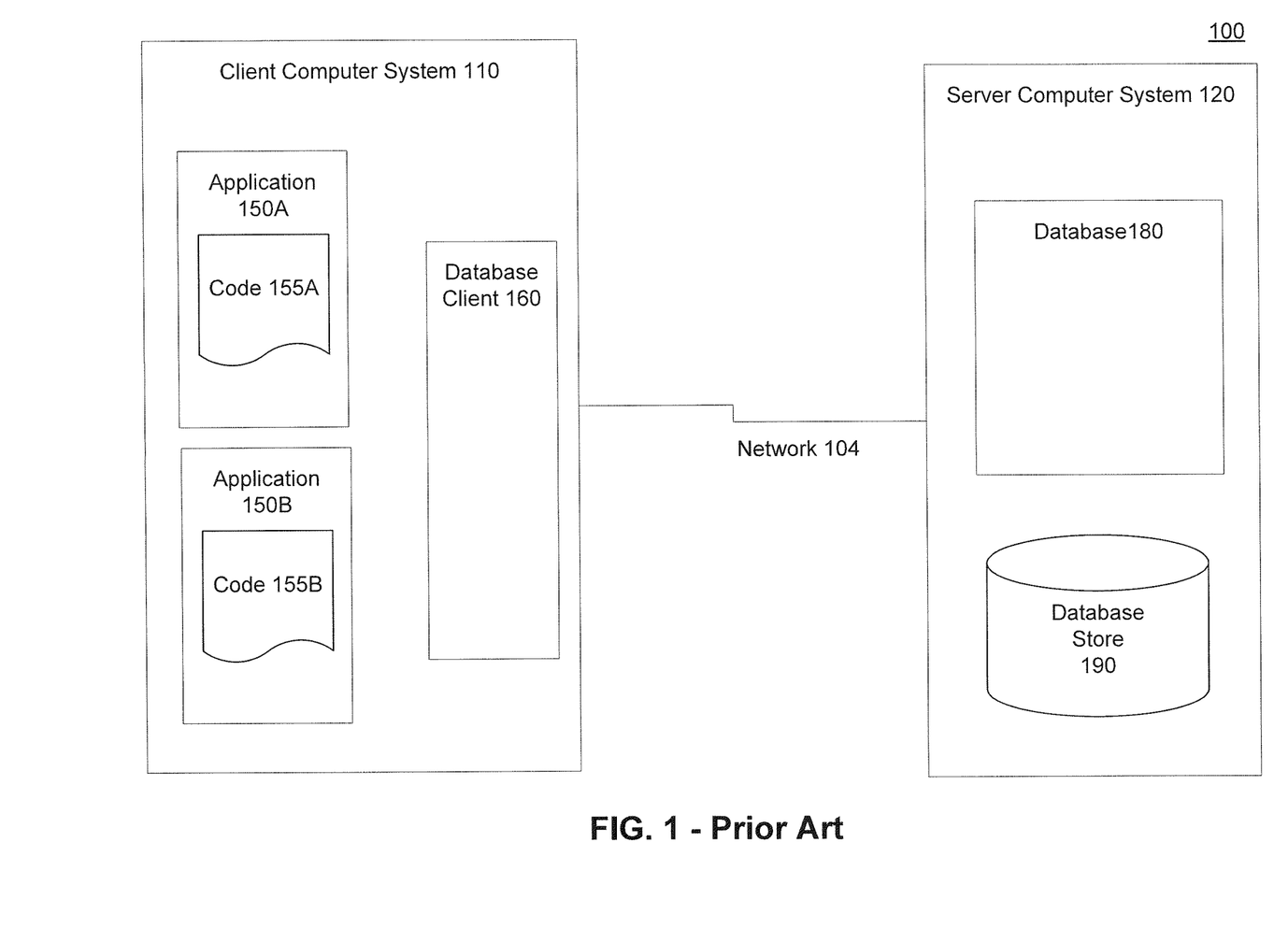
FIG. 1 depicts a conventional database system having a database client and database server.

FIG. 1 is an example of a conventional database system architecture 100. System architecture 100 includes client computer system 110 connected over network 104 to a server computer system 120. Client computer system 110 is depicted as having database client 160 and applications 150A-B—each application 150A-B depicted as having code 155A-B respectively. Server computer system is depicted as having database 180 and database store 190.

In conventional database system architecture 100 depicted on FIG. 1, applications 150A-B are applications that use data from database 180. In this example, code 155A-B include database command statements "embedded" in the code. These embedded command statements are passed to database client 160 where they are sent, via network 104, to database 180. Database 180 responds to these embedded command statements by providing results to database client 160, such results being distributed for use to applications 150A-B.

Overview of Embodiments of the Invention

In an embodiment, an application instruction submitted by a database client can be automatically converted and/or mapped, using a client-side statement cache, into a reference to a stored pre-processed database command statement stored on a database server. Such an approach can improve database performance by increasing the use of efficient and effective modern techniques, while not increasing application complexity.

As used typically herein, statement can refer to SQL statement, command, instruction, etc. As used typically herein, a pre-processed instruction can refer to an instruction that has been processed (e.g., by a database server) before the instruction is executed in a non-test mode in an application. Pre-processed instructions can also refer to processed versions of instructions that have been processed in a non-test mode and stored. Pre-processing can generate versions of instructions that are designed to have a higher performance than the original instructions. For example, using pre-processing to convert a standard SQL instruction into a dynamic SQL instruction is designed to improve the performance of the original instruction. Further examples of embodiments generating different versions of instructions are discussed below with the description of FIGS. 2-7.

Client-Side Statement Cache

Figure 2:
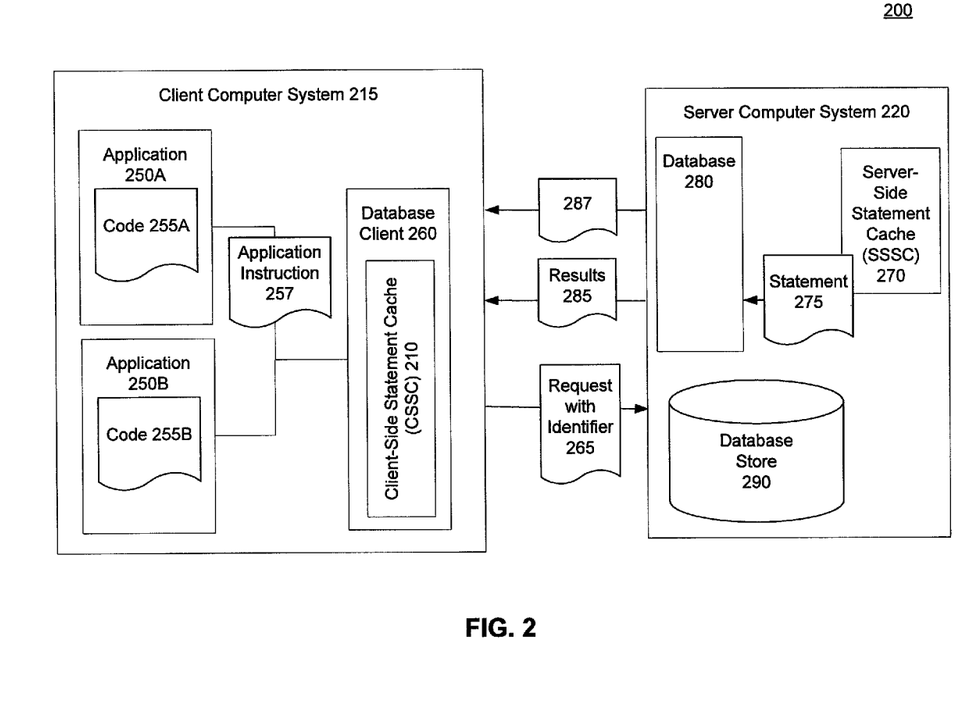
FIG. 2 depicts a database system having a database server and a database client, having a server side statement cache (SSSC) and a client-side statement cache (CSSC) respectively, according to an embodiment of the present invention.

FIG. 2 is an example database system architecture 200 in which embodiments of the present invention, or portions thereof, may be implemented. System architecture 200 includes client computer system 215 coupled to server computer system 220. While the embodiment of the invention depicted on FIG. 2 shows client computer system 215 connected to server computer system 220, it is important to note that embodiments can be used to exchange data between a variety of different types of computer-implemented data sources, systems and architectures.

Client computer system 215 has database client 260 and applications 250A-B—each application 250A-B having code 255A-B respectively. Database client 260 has client-side statement cache (CSSC) 210. Server computer system 220 has database 280, server-side statement cache (SSSC) 270 and database store 290. Statement 275 is relayed from SSSC 270 to database 280, results 285 are relayed from server computer system 220 to client computer system 215 and request with identifier 265 is relayed from client computer system 215 to server computer system 220.

An illustrative, non-limiting, example of the operation of CSSC 210 is described with reference to FIG. 2, and uses steps and descriptive notes G1-G12 listed below:

G1. In this example, application 250A requires data from database store 290. To access this data, application 250A is coupled to database client 260. Database client is configured to submit requests for data to database 280 and receive results. The received results are transferred to application 250A.

G2. Code 255A includes SQL instructions designed to retrieve the required data from database store 290 via database 280. In this example, code 255A contains embedded SQL instructions. An embodiment is configured to use CSSC 210 to convert selected code 255A embedded SQL statements into references to dynamic SQL statements.

G3. In one embodiment, as an initial step, application instruction 257 is received by database client 260, submitted by database client 260 to database 280 for analysis. In this analysis step, database 280 determines which of the code 255A statements will be selected for processing and storage in SSSC 270. In another embodiment, application instruction 257 is manually selected for processing and storage in SSSC 270, e.g., by the developer of application 250A or the database administrator of database 280. An embodiment terms the component performing this analysis to be the "cache advisor." An embodiment of a cache advisor is discussed with the description of FIG. 5 below.

G4. The statements from code 255A selected in step G3 above are processed by database 280 and a pre-processed version of the statements is stored in SSSC 270. In an example, the stored statements are DSQL. This series of steps G1-G4 may be termed in some embodiments, the "priming of the server side cache."

G5. After SSSC 270 is prepared by the steps above, database 280 is configured to send cache entries to CSSC 210 that are representations of the versions of the selected statements noted in step G4 above. In this step, a representation of selected statement 287 from code 255A is stored in CSSC 210, the representation 287 having an associated identifier. Each identifier is associated with a representation of instruction 287, and each representation 287 is associated with a version of a statement stored in SSSC 270. This step may be termed in some embodiments, the "priming of the client-side cache."

G6. Entering the application 250A execution phase of this example, application 250A relays application instruction 257 to database client 260 for submission to database 280. In this example, application instruction 257 is one of the selected embedded SQL statements noted in step G3-G4 above.

G7. After receiving application instruction 257, database client 260 checks CSSC 210 to determine if there is a cache entry matching the received statement. The generation of cache entries is described with step G5 above.

G8. In this example, because application instruction 257 was selected and processed by steps G3 and G4 above, a cache entry exists for application instruction 257 in CSSC 210.

G9. An identifier corresponding to the matching application instruction 257 cache entry is retrieved from CSSC 210.

G10. The retrieved identifier from step G9 is submitted to database 280, and database 280 retrieves a corresponding statement 275 from SSSC 270. In an embodiment, statement 275 is a dynamic SQL version of application instruction 257, the storage of this dynamic SQL statement being noted above with step G4 above.

G11. Retrieved statement 275 is used to affect the operation of database 280. In an embodiment, statement 275 is a dynamic SQL statement that performs a query on database store 290, such query returning results 285 data.

G12. The operation of application 250A continues with results 285 data produced from the execution of the retrieved dynamic SQL statement (statement 275). Results 285 may be relayed by database 280 to application 250A via database client 260.

As would be appreciated by one having skill in the relevant art(s), given the description herein, steps G1-G12 may be performed in a different order than listed, use different techniques and have different results without departing from the spirit of embodiments described herein. Not all steps G1-G12 listed above may be performed by embodiments and additional steps may be added.

Figure 3:
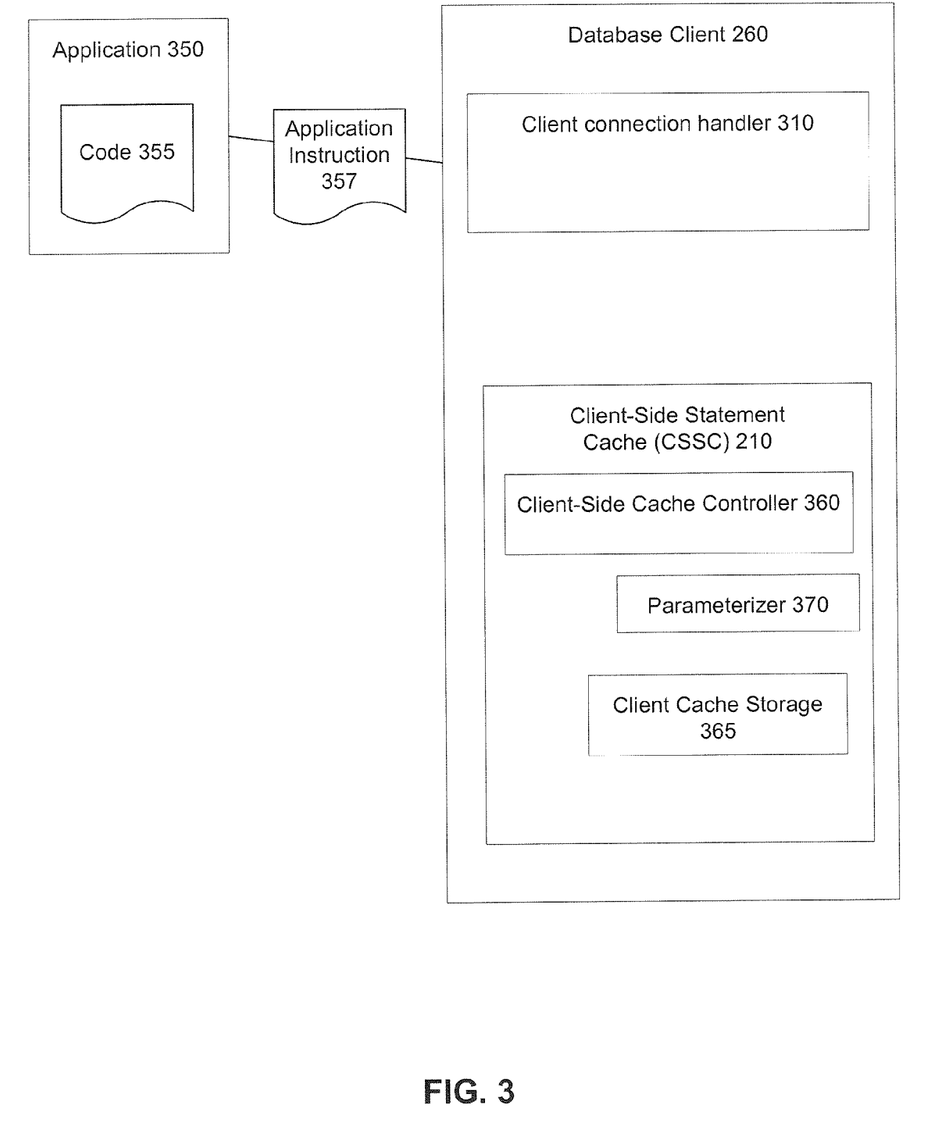
FIG. 3 depicts a detailed view of a database client having a CSSC with a parameterizer and client-side cache controller, according to an embodiment of the present invention.

In an embodiment, CSSC 210 is implemented using a hash table, such table having the text of each statement used as the hash keys. In an example, SQL query texts are used as hash keys in client cache storage 365. In should be appreciated that the cache entry stored in CSSC 210 need only be a representation of the instruction stored in SSSC 270, such representation sufficient to match with a compatible application instruction 257.

It should also be noted that applications 250A and 250B may share the same CSSC 210 and the instructions stored in SSSC 270. In this embodiment, the stored instructions may have the same identifier and request with identifier 265 may include the application (250A or 250B). As discussed with the description of FIG. 6 below, other approaches are also usable.

The example above described one type of server-side instruction, but it should be noted that the approaches described may be used for different types instruction processing.

Parameterization

FIG. 3 is a more detailed view of an embodiment of database client 260 and application 350. Database client 260 has client connection handler 310 and CSSC 210. CSSC 210 has client-side cache controller 360, client cache storage 365 and parameterizer 370. Application 350 has code 355.

Continuing reference to the DSQL example discussed with FIG. 2 above, certain characteristics of DSQL may enable DSQL instructions to have advantages during execution by database 280 over non-DSQL instructions. One example characteristic of DSQL that is relevant to some embodiments is parameterization.

One having skill in the relevant art(s) would appreciate that parameterization of SQL instructions involves using parameter variables in a SQL statement as opposed to literal values. Instead, for example, of a SQL statement that applies a criteria where "FieldX=10," a parameterized SQL statement applies a criteria where "FieldX=@@@Var," where @@@Var=10 is passed in as a parameter. One having skill in the relevant art(s) will be familiar with the advantages that may result from preprocessing a parameterized SQL statement then calling the preprocessed statement with a parameter.

Generally speaking, in an embodiment, the CSSC approach used by embodiments described with FIG. 2, has advantages in the conversion of non-parameterized SQL statements into parameterized SQL statements.

In an embodiment, the parameterization process is performed by parameterizer 370 to change SQL instruction literal values into parameters. For example, a SQL query instruction: "select name, id from sysobjects where id=10" can be transformed by an embodiment into "select name, id from sysobjects where id=@@@int" by the parameterization process. The literal values, once removed from the statement, are associated with the parameterized statement. Continuing the example above, because the literal "10" has been removed from the statement, this literal value is associated with the parameterized statement.

In a further example of parameterization: Even though two non-parameterized SQL statements differ only in a literal value, such as "select * from tab1 where col1=1" and "select * from tab1 where col1=2," they would require separate cache entries for cache storage and separate query plans for execution. However, if the literal values (1 and 2) were replaced with a parameter, @@@v, both statements would become the same: select * from tab1 where col1=@@@v, and the value of @@@v, would be set to 1 or 2 at execution time. In an embodiment, by parameterizing the literal values, only a single cache entry and a single query plan are required. As discussed below, further advantages may be obtained in an embodiment by storing the parameterized version of the instructions on database server 280 and using a process similar to the process described with FIG. 2 above.

An illustrative, non-limiting, example of the operation of an embodiment is described with reference to FIG. 3, and uses steps P1-P10 listed below:

P1. In a variation of step G3 discussed above with the description of FIG. 2, database 280 may use the existence of a non-parameterized instruction as a feature suggestive of processing and storage in SSSC 270 according to an embodiment. The analysis of the instruction may show that parameterization and caching can help the subsequent performance of the instruction.

P2. With step G4, discussed above with the description of FIG. 2, selected statements from code 355 may be processed by database 280 and a version of the statements are stored in SSSC 270. In this parameterization example, during this analysis phase, non-parameterized statements from code 355 that are able to be parameterized are processed, and parameterized versions stored in SSSC 270.

P3. Continuing this example, with step G5 discussed above with the description of FIG. 2, database 280 is configured to send the stored parameterized statements prepared by the steps above to CSSC 210. After this step, parameterized versions of selected code 355 statement representations are stored in client cache storage 365, each representation having an associated identifier corresponding to the stored representation in SSSC 270.

P4. In a variation of step G6 discussed above with the description of FIG. 2, during the execution phase, application 250A relays non-parameterized application instruction 357 to database client 260 for matching according to an embodiment. In a variation of step G7 discussed above with the description of FIG. 2, after receiving non-parameterized application instruction 357, client-side cache controller 360 determines whether the parameterized statement matches a representation cached within client cache storage 365 of CSSC 210.

P5. As with step G8 listed with the description of FIG. 2 above, in this example, because non-parameterized application instruction 357 was selected and processed by steps P1 and P2 above, a cache entry exists for non-parameterized application instruction 357 in CSSC 210. As noted in step P2, the cache entry matching non-parameterized application instruction 357 refers to a processed parameterized version of the instruction stored in SSSC 270.

P6. Based on the match of step P5, and similar to step G9 above, an identifier corresponding to the cache entry matching non-parameterized SQL statement is retrieved from CSSC 210.

P7. As discussed above, converting non-parameterized SQL instructions into parameterized SQL instructions by parameterizer 370 involves identifying a literal value in a SQL instruction and replacing the literal value with a parameter. The parameterized version is available to handle variations of the non-parameterized statement that have different literal values.

P8. Similar to step G10 described above, Client-side cache controller 360 sends the retrieved identifier and associated parameters to database 280 from FIG. 2, and as disclosed with the discussion of FIG. 4 below, database 280 receives the identifier and associated parameters.

P9. Upon receipt of the parameterized instruction and the associated parameter, database 280 retrieves a corresponding parameterized SQL statement 275 (generated from non-parameterized application instruction 357) from SSSC 270. In an embodiment, SQL statement 275 is a dynamic SQL version of application instruction 357, the storage of this dynamic SQL statement being noted above with step P2 above.

P10. Retrieved statement 275 is used to affect the operation of database 280. In an embodiment, statement 275 is a dynamic SQL statement that performs a query on database store 290, such query returning results 285 data.

This example of steps P1-P10 is illustrative and not intended to limit embodiments. As would be apparent to a person skilled in the art given this description, other approaches to operating database client 260 can be used by different embodiments without departing from the spirit described herein.

As would also be appreciated by one having skill in the relevant art(s), given the description herein, in different embodiments, steps P1-P10 above: may not be performed, only a subset of the steps may be performed, may be performed differently from the step described above, may be performed in combination with additional steps, and may be performed in a different order than the order described.

Figure 4:
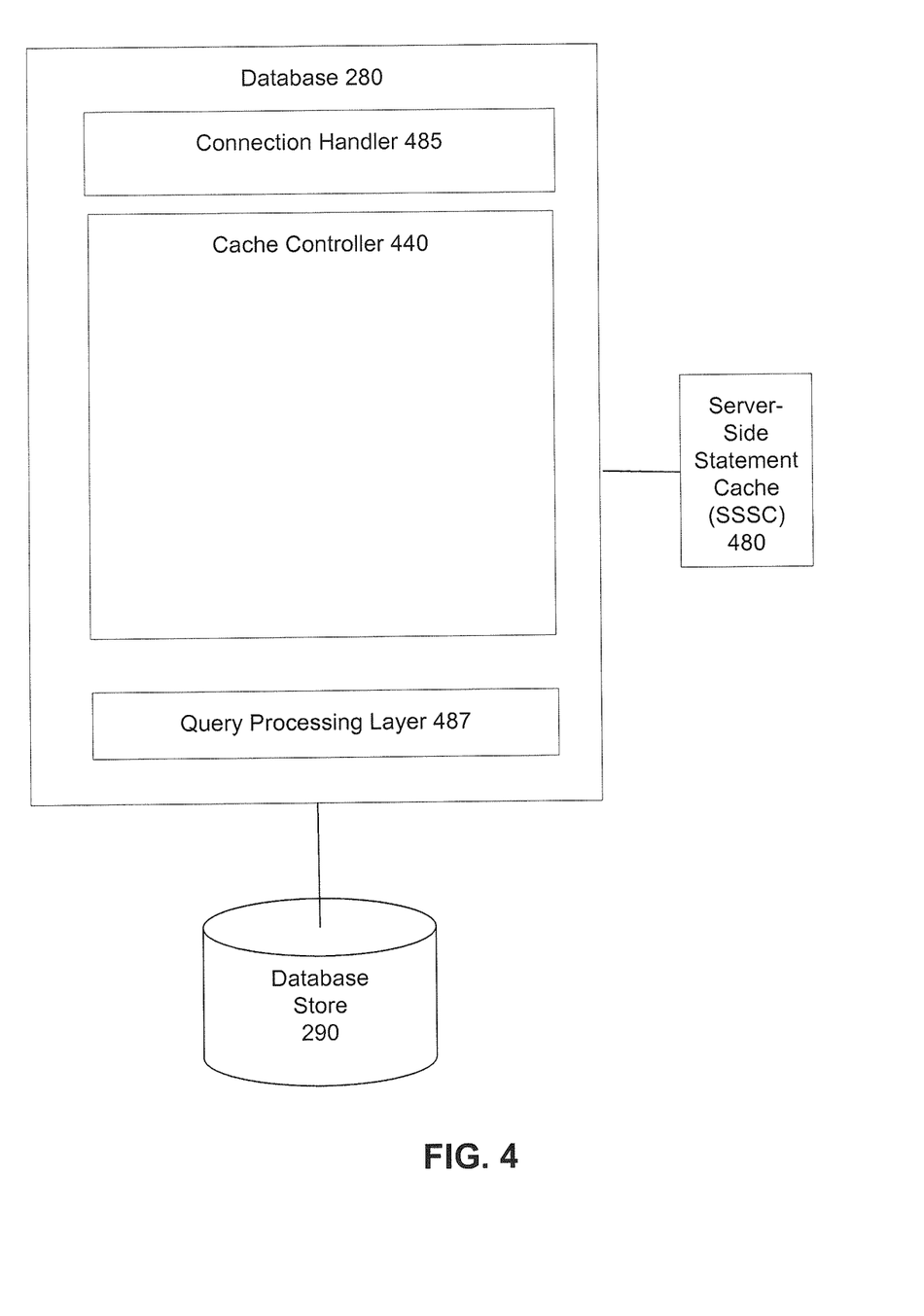
FIG. 4 depicts a detailed view a database coupled to a SSSC with a parameterizer and client-side cache controller, according to an embodiment of the present invention.

FIG. 4 is a more detailed view of an embodiment of database 280. Database 280 is depicted having connection handler 485, server side cache controller (SSCC) 440 and query processing layer 487. Database 280 is depicted coupled to database store 290 and server-side statement cache (SSSC) 480.

Looking in further detail to the operation of an embodiment of database 280, in an illustrative, non-limiting, example discussed with reference to FIG. 3, the following steps DB1-DB5 are performed:

DB1. As described with step P8 above, connection handler 485 receives the identifier and associated parameters relayed from client side cache controller 360.

DB2. Server side cache controller 440 uses the received identifier to retrieve a statement from SSSC 480. In an embodiment, the retrieved statement is pre-processed version of the embedded statement first discussed with P1 above. In another embodiment, the pre-processed statement from SSSC 480 is a dynamic SQL statement.

DB3. Server side cache controller 440 combines the associated parameters with the retrieved statement from SSSC 480.

DB4. Server side cache controller 440 uses the retrieved statement to affect the operation of database 280. In a variation of the example, the retrieved statement is a dynamic SQL query, and server side cache controller 440 uses the query to retrieve data from database store 280. In this example, when the dynamic SQL query (also known as a dynamic execute command) is processed by database 280, the corresponding query plan is directly obtained and executed. By using a pre-processed query plan, an embodiment can avoid the parsing, query tree building, preprocessing, optimization and code generation steps performed by the query processing layer.

DB5. Application 250A from FIG. 3 continues operation, with the embedded statement from steps P1-P10 above having affected the operation of database 280 as noted in step DB4. Continuing the example noted with step DB4, the dynamic SQL query is used by query processing layer 487 to retrieve data from database store 290, and such data is relayed to application 350 via database client 260.

These examples of steps DB1-DB5 are illustrative and not intended to limit embodiments. As would be apparent to a person skilled in the art given this description, other approaches to operating database 280 can be used by different embodiments without departing from the spirit described herein.

As would also be appreciated by one having skill in the relevant art(s), given the description herein, in different embodiments, steps DB1-DB5 above: may not be performed, only a subset of the steps may be performed, may be performed differently from the step described above, may be performed in combination with additional steps, and may be performed in a different order than the order described.

Cache Advisor

Figure 5:
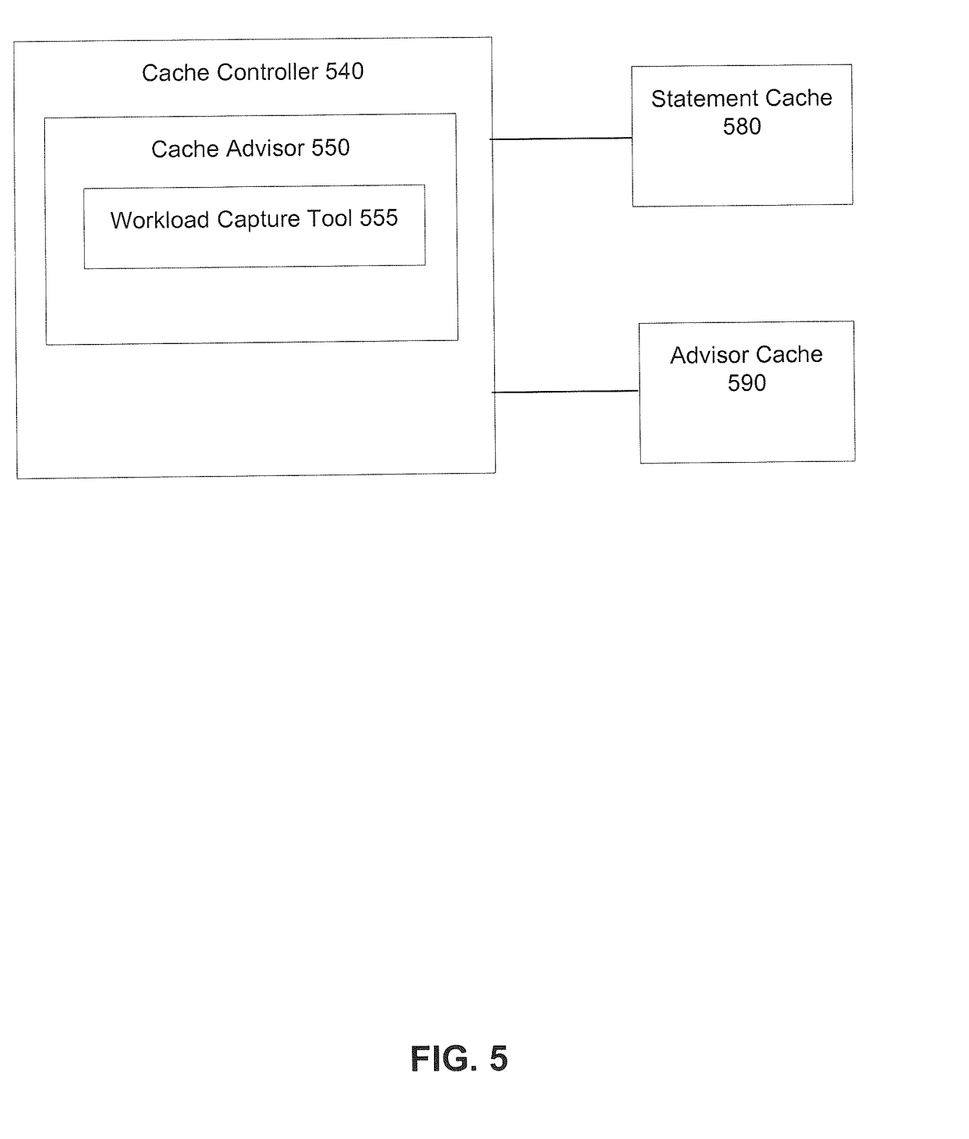
FIG. 5 depicts a cache advisor having a workload capture tool, according to an embodiment of the present invention.

FIG. 5 is a more detailed view of cache controller 540. Cache controller 540 is depicted having cache advisor 550, such cache advisor 550 having workload capture tool 555. Cache controller 540 is depicted coupled to SSSC 580 and advisor cache 590.

As noted above with item P5 above, in database client 260, client-side cache controller 360 determines whether a non-parameterized statement has a parameterized version cached within SSSC 580. In an embodiment, references to instructions are selected for entry in client cache storage 365 by cache advisor 550.

Looking in further detail to the operation of an embodiment of cache advisor 550, in an illustrative, non-limiting, example discussed with reference to FIG. 5, the following steps CA1-CA7 are performed:

CA1. According to an embodiment, cache advisor 550 is enabled to monitor the queries that are received by connection handler 485 for processing by database 280. Workload capture tool 555 is enabled to capture all of the queries sent to database 280 from all of the applications 250A-B that are running on database system architecture 200.

CA2. The captured workload is analyzed by cache advisor 550, which can select a "workset" of queries associated with each respective application 250A-B.

CA3. In an embodiment, this capture and analysis of statements to form a workset is termed a "capture/gathering phase," such phase being performed when applications 250A-B are executed either in production or test bed modes.

CA3A. In another embodiment, instead of capturing a "workset" of queries associated with an application during the capture phase described above, cache advisor 550 analyzes each instruction received in normal database operation. This approach allows the dynamic creation and modification of the workset, with statement representations and identifiers being sent to CSSC 210 as they are generated. This approach does not require "priming" of the caches as described above, rather cache entries are created and modified "on the fly." In yet another embodiment, a combination of the CA3 and CA3A approaches can be implemented.

CA4. In an embodiment for each statement, cache advisor 550 can estimate the system resource cost of executing the statement, and rank the statement against other evaluated statements executed in the same application. As would be appreciated by one having skill in the relevant art(s), given the description herein, other approaches to evaluating statements for inclusion CSSC 210 and SSSC 580 can be used.

CA5. A storage memory limit can be assigned for each application 250A-B, and if this memory limit is set then, in an embodiment, cache advisor 550 is configured to select the top-N ranked statements-ranking being established according to different performance criteria. As would be appreciated by one having skill in the relevant art(s), given the description herein, cache eviction techniques can be used to advantageously remove statements from the cache structures described herein.

CA6. Cache advisor 550 assigns each statement in the selected workset an associated identifier, and uses query processing layer 587 to generate query plans for each.

CA7. After the analysis, for each statement, cache advisor 550 output includes a set of rows including: ID, SQL statement text, abstract query plan, client application ID (250A or B). In different embodiments, additional information generated by cache advisor 550 analysis can be included. In an embodiment, the entries generated by cache advisor 550 are stored in advisor cache 590 before being sent to CSSC 210.

These examples of steps CA1-CA7 are illustrative and not intended to limit embodiments. As would be apparent to a person skilled in the art given this description, other approaches to operating cache advisor 550 can be used by different embodiments without departing from the spirit described herein.

As would also be appreciated by one having skill in the relevant art(s), given the description herein, in different embodiments, steps CA1-CA7 above: may not be performed, only a subset of the steps may be performed, may be performed differently from the step described above, may be performed in combination with additional steps, and may be performed in a different order than the order described.

Multiple Caches

Figure 6:
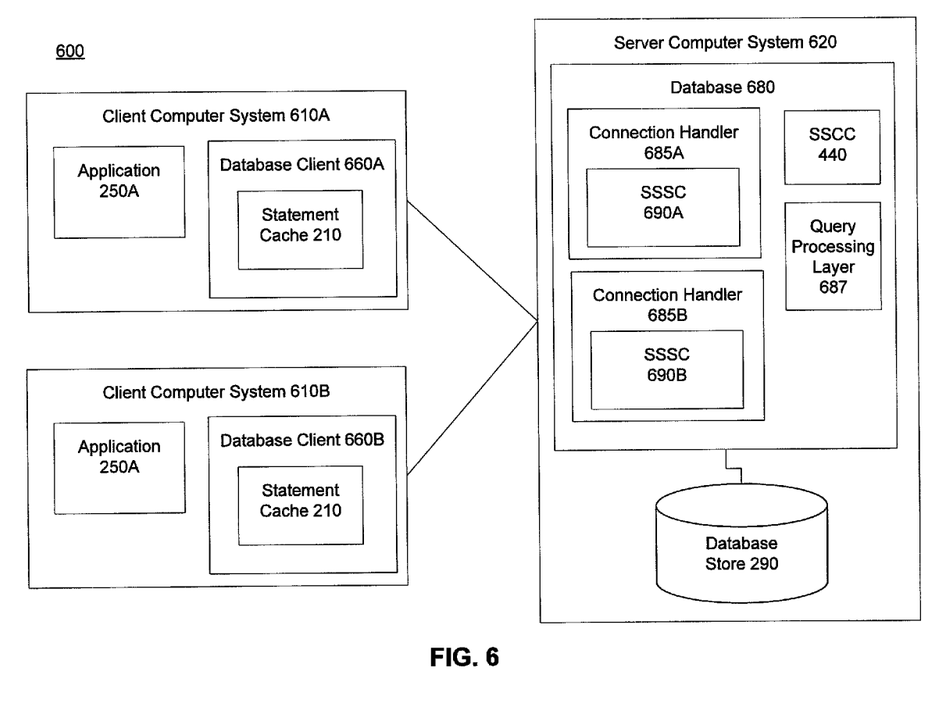
FIG. 6 depicts a database system having a database server and two database clients, each client having a statement cache, and the database having two connection handlers, according to an embodiment of the present invention.

FIG. 6 depicts an example database system architecture 600 in which embodiments of the present invention, or portions thereof, are implemented. System architecture 600 includes client computer systems 610A-B coupled to server computer system 620, in accordance with an embodiment of the present invention. While the embodiment of the invention depicted on FIG. 6 shows client computer systems 610A-B coupled to server computer system 620, it is important to note that embodiments can be used to exchange data between any type of computer-implemented data sources, systems and architectures.

Client computer systems 610A-B are depicted as having applications 650A-B, database clients 660A-B and applications 650A-B respectively. Server computer system 620 is depicted as having database 680 and database store 290. Database 680 is depicted having server-side cache controller (SSCC) 440, query processing layer 687 and connection handlers 685A-B, each connection handler having server side statement cache (SSSC) 690A-B respectively.

In the embodiment depicted on FIG. 6, database 680 uses multiple connection handlers 685A-B to handle connections from multiple database clients 660A-B. Each connection handler may be configured to store instructions for an application 650A-B, e.g., SSSC 690A storing instructions for application 650A and SSSC 690B storing instructions for application 650B. In this example, SSCC 440 operates to control both caches. As would be appreciated by on having skill in the relevant art(s), given the description herein, different configuration options (not shown) may be used without departing from the spirit of the invention disclosed herein, e.g., multiple SSCCs 440, a single connection handler having multiple SSSCs 690 and other.

Method 700

Figure 7:
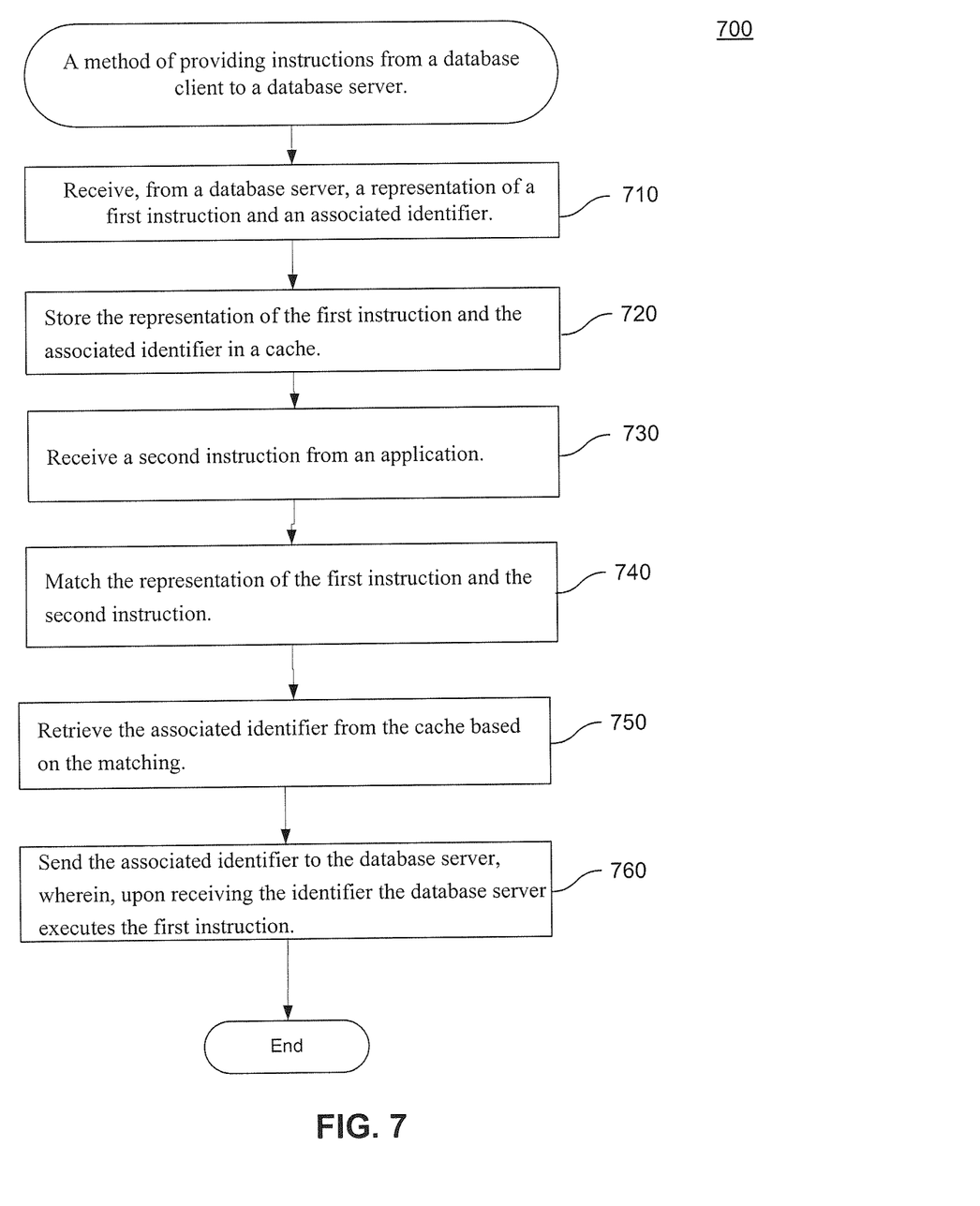
FIG. 7 shows a flowchart illustrating a method of providing inheritance to a programming language according to an embodiment of the present invention.

This section and FIG. 7 summarizes one of the techniques described herein by presenting a flowchart of an exemplary method 700 of providing instructions from a database client to a database server. While method 700 is described with respect to an embodiment of the present invention, method 700 is not meant to be limiting and may be used in other applications.

As shown in FIG. 7, an embodiment of method 700 begins at step 710 where a representation of a first instruction and an associated identifier is received from a database. In an embodiment, as shown on FIG. 2, a database client, such as database client 210, receives a representation of a first instruction and an associated identifier, such as representation of an instruction 287 from a database, such as database 280. Once step 710 is complete, method 700 proceeds to step 720.

At step 720, the representation of the first instruction and the associated identifier is stored in a cache. In an embodiment, as shown on FIG. 2, the representation of the first instruction and an associated identifier, such as representation of an instruction 287 and an associated identifier, is stored in a cache, such as client-side statement cache 210. Once step 720 is complete, method 700 proceeds to step 730.

At step 730, a second instruction is received from an application. In an embodiment, as shown on FIG. 2, a second instruction, such as application instruction 257, is received from an application, such as application 250A. Once step 730 is complete, method 700 proceeds to step 740.

At step 740, the representation of the first instruction is matched with the second instruction. In an embodiment, as shown on FIG. 2, the representation of the first instruction, such as representation of an instruction 287, is matched with the second instruction, such as application instruction 257. Once step 740 is complete, method 700 proceeds to step 750.

At step 750, the associated identifier is retrieved from the cache based on the matching. In an embodiment, as shown on FIG. 2, the associated identifier, such as the identifier from step 720 above, is retrieved from a cache, such as client side statement cache 210, based on the matching, such as the matching between application instruction 257 and the representation of the first instruction 287 described with step 740 above. Once step 750 is complete, method 700 proceeds to step 760.

At step 760, the associated identifier is sent to the database server, wherein, upon receiving the identifier the database server executes the first instruction. In an embodiment, the associated identifier, such as the associated identifier described with step 750 above, is sent to a database server, such as database server 280, wherein, upon receiving the identifier the database server executes the first instruction, such as instruction 275 from FIG. 2. When step 760 is completed, method 700 ends.

Example Computer Embodiment

In an embodiment of the present invention, the system and components of embodiments described herein are implemented using well known computers. For example, all of the components in FIGS. 2-6, database system architectures 200 and 600 shown in FIGS. 2 and 6 respectively, and the operation of the flowchart in FIG. 7 described above, can be implemented using computer(s) 802.

Figure 8:
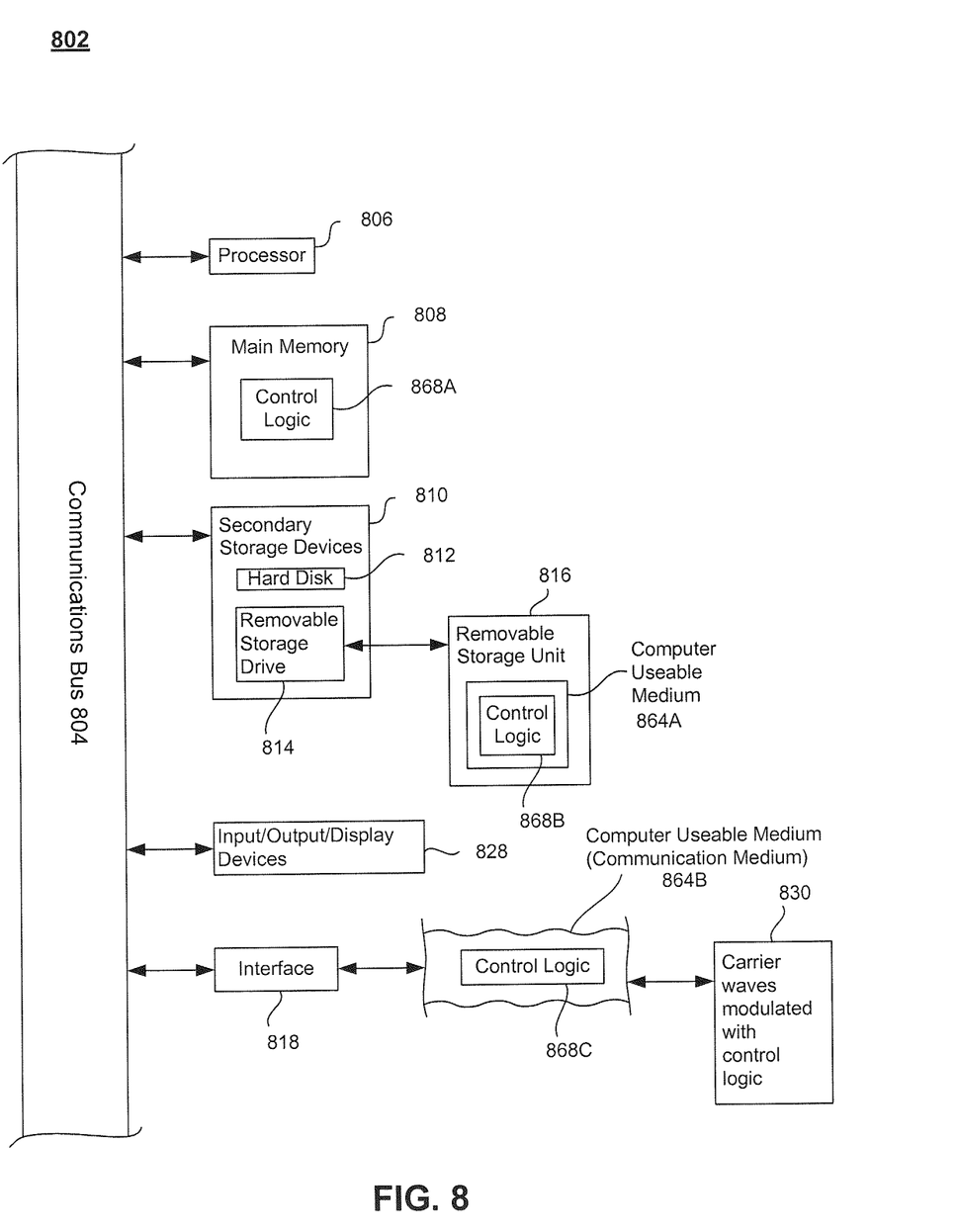
FIG. 8 illustrates an example computer system, useful for implementing components of embodiments described herein, according to an embodiment of the present invention.

Computer 802 can be any commercially available and well known computer capable of performing the functions described herein, such as computers available from International Business Machines, Apple, Sun, HP, Dell, Compaq, Digital, Cray, etc.

The computer 802 includes one or more processors (also called central processing units, or CPUs), such as a processor 806. The processor 806 is connected to a communication bus 804. The computer 802 also includes a main or primary memory 808, such as random access memory (RAM). The primary memory 808 has stored therein control logic 868A (computer software), and data.

The computer 802 also includes one or more secondary storage devices 810. The secondary storage devices 810 include, for example, a hard disk drive 812 and/or a removable storage device or drive 814, as well as other types of storage devices, such as memory cards and memory sticks. The removable storage drive 814 represents a floppy disk drive, a magnetic tape drive, a compact disk drive, an optical storage device, tape backup, etc.

The removable storage drive 814 interacts with a removable storage unit 816. The removable storage unit 816 includes a computer useable or readable storage medium 824 having stored therein computer software 868B (control logic) and/or data. Removable storage unit 816 represents a floppy disk, magnetic tape, compact disk, DVD, optical storage disk, or any other computer data storage device. The removable storage drive 814 reads from and/or writes to the removable storage unit 816 in a well known manner.

The computer 802 also includes input/output/display devices 828, such as monitors, keyboards, pointing devices, etc.

The computer 802 further includes a communication or network interface 818. The network interface 818 enables the computer 802 to communicate with remote devices. For example, the network interface 818 allows the computer 802 to communicate over communication networks or mediums 864B (representing a form of a computer useable or readable medium), such as LANs, WANs, the Internet, etc. The network interface 818 may interface with remote sites or networks via wired or wireless connections.

Control logic 868C may be transmitted to and from the computer 802 via the communication medium 864B. More particularly, the computer 802 may receive and transmit carrier waves (electromagnetic signals) modulated with control logic 830 via the communication medium 864B.

Any apparatus or manufacture comprising a computer useable or readable medium 864 having control logic (software) 868B stored therein is referred to herein as a computer program product or program storage device (which are articles of manufacture). This includes, but is not limited to, the computer 802, the main memory 808, secondary storage devices 810, the removable storage unit 816 and the carrier waves modulated with control logic 830. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

CONCLUSION

Embodiments described herein provide methods and systems for providing instructions from a database client to a database server. The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A method of providing instructions from a database client to a database server, comprising:

receiving a plurality of embedded structured query language (SQL) instructions;

sending the plurality of embedded SQL instructions to the database server, wherein the database server analyzes the plurality of embedded SQL instructions;

receiving, from the database server and based on the analyzing by the database server, a representation of a first instruction and an associated identifier, wherein the first instruction comprises a pre-processed dynamic SQL instruction converted from a first embedded SQL instruction from the plurality of embedded SQL instructions;

storing the representation of the first instruction and the associated identifier in a cache;

receiving a second instruction from an application, wherein the second instruction is not identical to the first instruction and comprises a second embedded SQL instruction from the plurality of embedded SQL instructions;

matching the representation of the first instruction and the second instruction;

retrieving the associated identifier from the cache based on the matching; and sending the associated identifier to the database server, wherein, upon receiving the associated identifier the database server executes the first instruction.

2. The method of claim 1, wherein the second instruction has a parameter, and wherein the sending the associated identifier to the database server comprises sending the associated identifier and the parameter to the database server, wherein, upon receiving the identifier and the parameter, the database server executes the first instruction using the parameter.

3. The method of claim 1, wherein the cache is a client-side statement cache.

4. The method of claim 1, wherein the storing of the representation of the first instruction in a cache comprises:
storing the representation in both a memory and in a file, wherein upon next starting of the database client the memory is loaded from the file.

5. The method of claim 1, wherein each application that uses the database client has a different identifier associated with the first instruction.

6. The method of claim 1, wherein each application that uses the database client has the same identifier associated with the first instruction.

7. The method of claim 1, before the receiving a representation of a first instruction from a database server, further comprising:
receiving a plurality of instructions from the application, wherein one of the plurality of instructions is the second instruction;
sending the plurality of instructions to the database server, wherein the database server analyzes the plurality of instructions, and
wherein the receiving of the representation of a first instruction from a database server is based on the analyzing by the database server.

8. The method of claim 1, wherein the first instruction is a processed version of the second instruction.

9. The method of claim 1, wherein the storing the representation further comprises storing the representation of the first instruction in a hash table by using the first instruction as a hash key.

10. An apparatus in a database client, comprising:
a cache controller configured to, using a processor, receive from a database server, based on an analysis by the database server, a representation of a first instruction and an associated identifier, wherein the cache controller is further configured to store the representation of the first instruction and the associated identifier in a cache, and further wherein the first instruction comprises a pre-processed dynamic structured query language (SQL) instruction converted from a first embedded SQL instruction from a plurality of embedded SQL instructions;
an application interface coupled to an application, wherein the application interface is configured to:
receive the plurality of embedded SQL instructions;
send the plurality of embedded SQL instructions to a database server, wherein the database server analyzes the plurality of embedded SQL instructions; and
receive a second instruction from the application, wherein the second instruction is not identical to the first instruction and comprises a second embedded SQL instruction from the plurality of embedded SQL instructions;
a matcher configured to match, using a processor, the representation of the first instruction to the received second instruction;
an identifier retriever configured to retrieve an identifier from the cache based on a result from the matcher; and
a database interface configured to send the identifier to the database, wherein upon receipt of the identifier, the database server is configured to execute the first instruction.

11. The apparatus of claim 10, wherein the second instruction has a literal value, further comprising:
a parametizer configured to generate a parameter by identifying and parameterizing the literal value in the second instruction;
wherein the sending of the identifier to the database server comprises sending the identifier and the parameter to the database server, and
wherein, upon receiving the identifier and the parameter, the database server executes the first instruction using the parameter.

12. The apparatus of claim 10, wherein the cache is a client-side statement cache.

13. The apparatus of claim 10, wherein the storing of the representation of the first instruction in a cache comprises:
storing the representation in both a memory and in a file, wherein upon next starting of the database client the memory is loaded from the file.

14. The apparatus of claim 10, wherein each application that uses the database client has a different identifier associated with the first instruction.

15. The apparatus of claim 10, wherein each application that uses the database client has the same identifier associated with the first instruction.

16. The method of claim 7, wherein the analyzing by the database server further comprises estimating a system resource cost of executing the plurality of instructions.

17. A method of executing database instructions, comprising:
receiving a plurality of embedded structured query language (SQL) instructions from one or more database clients;
processing a first database instruction to create a processed version of the first database instruction, wherein the first instruction comprises a pre-processed dynamic SQL instruction converted from a first embedded SQL instruction from the plurality of embedded SQL instructions;
assigning an identifier to the processed version of the first database instruction;
storing the identifier and the processed version of the first database instruction;
sending the identifier and a representation of the processed version of the first database instruction to a cache on the one or more database clients;
receiving a value that corresponds to the identifier from the database client, wherein the identifier is received based on a second database instruction, the second database instruction being not identical to the first instruction and comprises a second embedded SQL instruction from the plurality of embedded SQL instructions; and
wherein, based on the received identifier, a database server executes the processed version of the first database instruction.

18. The method of claim 17, before the assigning of the identifier to the processed instruction, further comprising
analyzing a database instruction received from a database client; and
determining whether to create the processed version of the database instruction based on the analyzing.

19. The method of claim 17, after the receiving the value that corresponds to the identifier from the database client, further comprising:
receiving a parameter,
wherein the processed version of the database instruction is a parameterized version of the database instruction, and
wherein the executing of the processed version of the database instruction is based on the received identifier and the received parameter.

20. A non-transitory computer-readable medium having computer-executable instructions stored thereon that, when executed by a computing device, cause the computing device to perform instructions, the instructions comprising:

receiving a plurality of embedded structured query language (SQL) instructions;

sending the plurality of embedded SQL instructions to a database server, wherein the database server analyzes the plurality of instructions;

receiving, from the database server and based on the analyzing by the database server, a representation of a first instruction and an associated identifier, wherein the first instruction comprises a pre-processed dynamic SQL instruction converted from a first embedded SQL instruction from the plurality of embedded SQL instructions;

storing the representation of the first instruction and the associated identifier in a cache;

receiving a second instruction from an application, wherein the second instruction is not identical to the first instruction and comprises a second embedded SQL instruction from the plurality of embedded SQL instructions;

matching the representation of the first instruction and the second instruction;

retrieving the associated identifier from the cache based on the matching; and sending the associated identifier to the database server, wherein, upon receiving the associated identifier the database server executes the first instruction.

* * * * *